(12) United States Patent
Cincera

(10) Patent No.: US 8,548,912 B2
(45) Date of Patent: Oct. 1, 2013

(54) TRANSACTION PRE-PROCESSING WITH MOBILE DEVICE FOR A CURRENCY DISPENSING DEVICE

(75) Inventor: Matthew Brian Cincera, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 340 days.

(21) Appl. No.: 12/753,217

(22) Filed: Apr. 2, 2010

(65) Prior Publication Data

US 2011/0246316 A1    Oct. 6, 2011

(51) Int. Cl.
*G06Q 40/00* (2012.01)

(52) U.S. Cl.
USPC ............................... 705/43; 235/379

(58) Field of Classification Search
USPC ............................... 705/43; 235/379
See application file for complete search history.

(56) References Cited

U.S. PATENT DOCUMENTS

| | | | | |
|---|---|---|---|---|
| 6,793,134 | B2 * | 9/2004 | Clark | 235/379 |
| 7,216,800 | B1 * | 5/2007 | Ramachandran | 235/379 |
| 7,481,359 | B2 * | 1/2009 | Kawase et al. | 235/379 |
| 2001/0051922 | A1 * | 12/2001 | Waller et al. | 705/43 |
| 2003/0217005 | A1 * | 11/2003 | Drummond et al. | 705/43 |
| 2004/0204078 | A1 * | 10/2004 | Fare et al. | 455/557 |
| 2005/0262017 | A1 * | 11/2005 | Kawase et al. | 705/39 |
| 2007/0203835 | A1 * | 8/2007 | Cai | 705/43 |
| 2008/0261560 | A1 * | 10/2008 | Ruckart | 455/411 |
| 2011/0022484 | A1 * | 1/2011 | Smith et al. | 705/17 |

FOREIGN PATENT DOCUMENTS

GB       2396472 A  *  6/2004

OTHER PUBLICATIONS

Franklin, Diane. The geography of ATMs. Apr. 2009. Credit Union Management. v32n4. pp. 44-47.*
Anonymous. MasterCard Worldwide announced the availability of the MasterCard ATM Hunter application for BlackBerry smartphones. Mar. 16, 2009. Wireless News.*

* cited by examiner

*Primary Examiner* — Scott Zare
(74) *Attorney, Agent, or Firm* — Banner & Witcoff, Ltd.; Michael A. Springs

(57) ABSTRACT

A system and method of pre-processing a transaction using a mobile device are presented. The system and method may include beginning a transaction at a mobile device. Beginning the transaction may include receiving transaction information at the mobile device. The transaction information may include a transaction identifier, type of transaction, method of payment, and the like. In some examples, the transaction information may be stored at the mobile device. A network associated with a merchant or ATM associated with a financial institution may be detected at the mobile device. The mobile device may connect to the detected network and the transaction may be completed.

12 Claims, 9 Drawing Sheets

600

| TRANSACTION INFORMATION | |
|---|---|
| TRANSACTION ID: | LUNCH — 602 |
| TYPE OF TRANSACTION: | PURCHASE — 604 |
| AMOUNT OF TRANSACTION: | $20.00 — 606 |
| METHOD OF PAYMENT: | EFT — 608 |
| ROUTING NUMBER: | AAAAAAAA — 610 |
| ACCOUNT NUMBER: | BBBBBBBBB — 612 |

FIG. 6

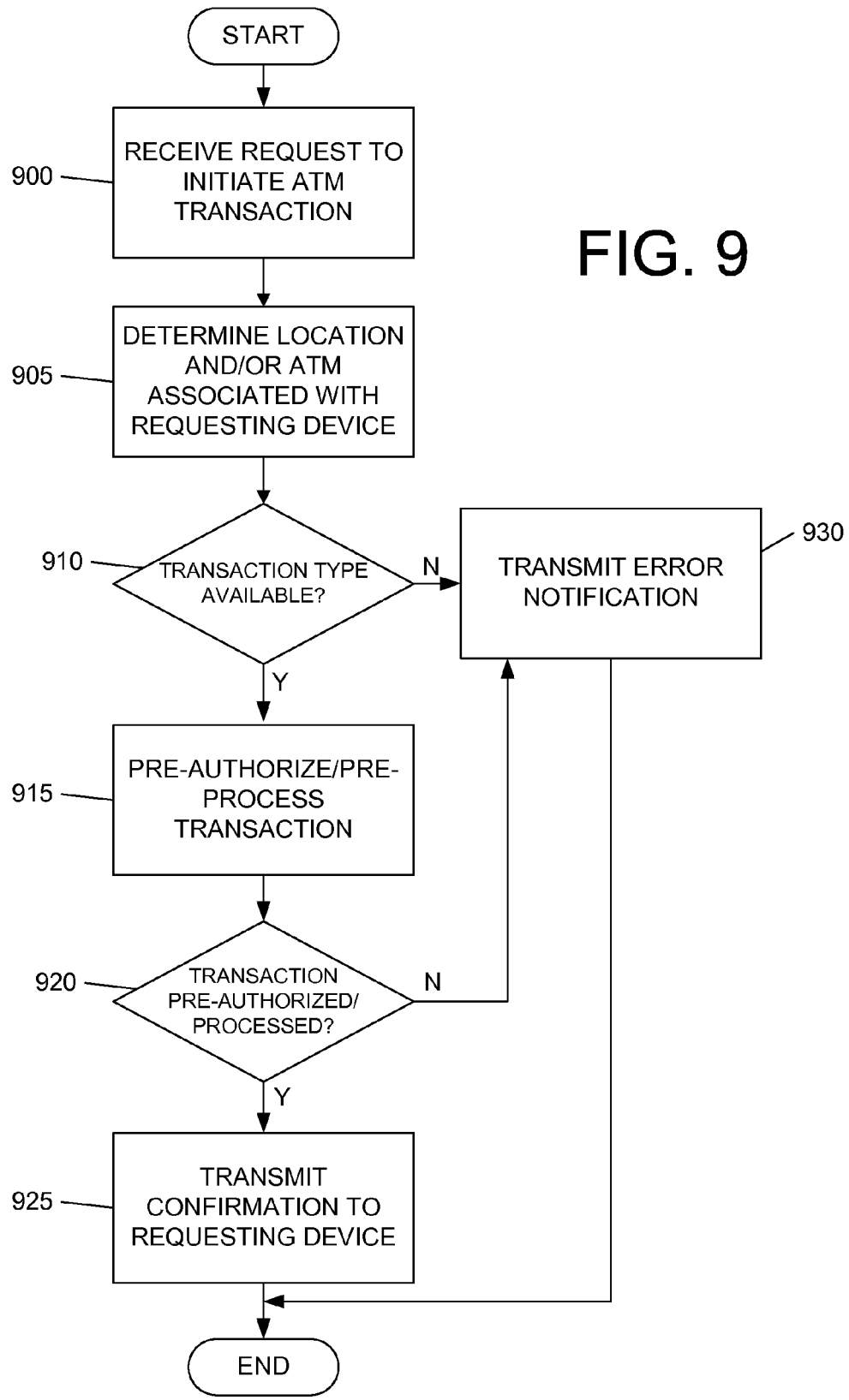

TRANSACTION PRE-PROCESSING WITH MOBILE DEVICE FOR A CURRENCY DISPENSING DEVICE

BACKGROUND

In today's busy society, people are always looking for ways to save time and accomplish tasks more efficiently. Mobile devices are one tool that has helped people to work and function more efficiently than in years past. Functionality provided by today's mobile devices allows people to perform all manner of tasks in a faster, more convenient fashion than ever before.

However, people in society still spend precious time waiting in line for various reasons. For instance, people often wait in line to make a purchase, such as food, clothing, or to obtain various services, and the like. In one example, people often wait in line to use automated teller machines (ATMs) to deposit money or to obtain cash. It would be advantageous to reduce or eliminate the time spent waiting in these lines.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects described herein relate to the pre-processing of transaction information for a transaction that is to be conducted at a transaction processing system. A user may submit transaction information and initiate the transaction prior to reaching or physically interacting with the transaction processing system. This may allow a user's wait time (e.g., while waiting in line for use of the transaction processing system) to be used more effectively. In one example, a user may submit a transaction request including a desired type of transaction, a transaction amount and/or user identification information. The transaction request may correspond to a deposit or withdrawal at an ATM device and the user identification information may include a user's bank card number and/or a personal identification number (PIN). This information may be pre-processed by a financial institution and/or the transaction processing system to determine whether the transaction is authorized and allowed. If so, once the user reaches the transaction processing system (e.g., an ATM), the user might not need to enter information such as the transaction type and the transaction amount. Instead, the user may login and immediately receive a requested amount of funds (e.g., for a withdrawal) or be prompted to insert an amount of currency (e.g., for a deposit).

According to another aspect, transactions may be stored and later forwarded or transmitted to a transaction processing system. For example, transaction information may be initially entered and stored by a user at a computing device. Because the computing device might not be within communication range of a transaction processing system (e.g., the user is entering transaction information at home whereas the transaction processing system is at a bank or retail store), the user may enter and store transaction information on a device so that once the device is within range, the user does not need to enter the information at that time. Accordingly, once the device is within communication range of the transaction processing system (e.g., a point of sale), the device may transmit the transaction information to the processing system for approval and processing. In some arrangements, the transaction information is transmitted prior to the user reaching the transaction processing system.

According to another aspect, a transaction processing system may provides various forms of confirmation upon receipt of transaction information and/or upon pre-authorizing or approving a transaction. For example, the transaction processing system may respond to a transaction initiation request with confirmation that the transaction information was received and that the transaction was approved. In another example, the transaction processing system may provide a confirmation including a transaction identifier or security code that may be used to retrieve the pre-authorized transaction upon reaching the processing system.

According to yet another aspect, transaction may be pre-processed and pre-authorized for a limited amount of time. For example, a user may be required to complete the transaction within 15 minutes or 30 minutes of receiving confirmation that the transaction is pre-approved/processed. If the user does not complete the transaction within the specified time frame, the user may be required to process the transaction anew.

BRIEF DESCRIPTION OF THE DRAWINGS

The present disclosure is illustrated by way of example and not limited in the accompanying figures in which like reference numerals indicate similar elements.

FIG. 6 illustrates one example user interface illustrating transaction information options according to one or more aspects described herein.

FIG. 9 is a flowchart illustrating a method by which a transaction may be pre-processed by a financial institution system according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
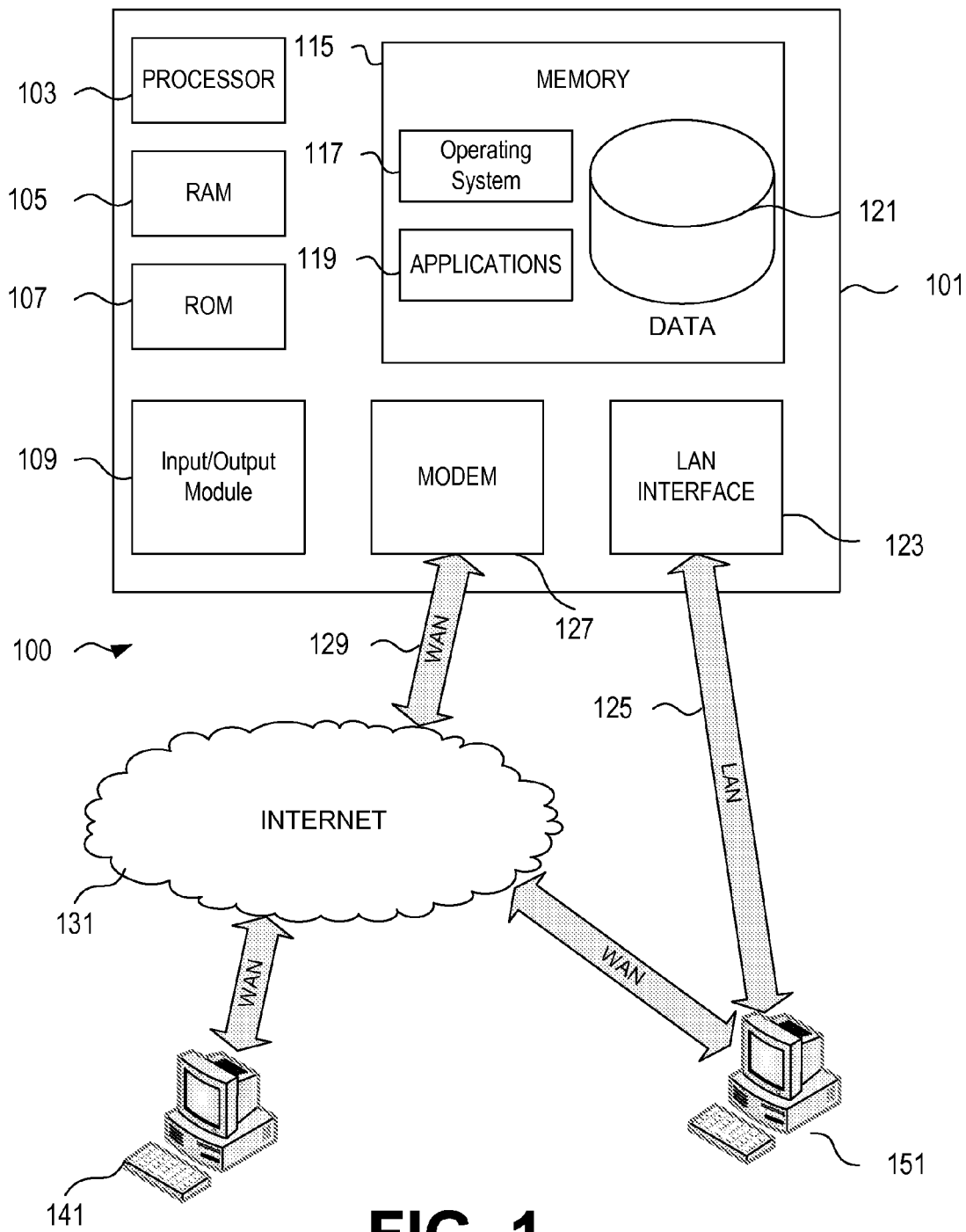
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The systems, devices, networks, and the like of FIG. 1, may, in one or more arrangements, be used to provide functionality to one or more cash handling devices, such as an automated teller machine (ATM), point of sale systems, and the like. For instance, according to some aspects of the invention, transactions between merchants and users, including at least the purchase of goods of services, various financial transactions via ATM, , and the like may be conducted using the systems, devices, networks, and the like described. In some examples, a user may begin a transaction at a mobile device, home computer, and the like and complete the transaction at the merchant, such as by connecting to the point of sale system, ATM, and the like to complete the transaction. Beginning the transaction at the mobile device may allow a user to save time in completing the transaction. For instance, in some examples, a user may, while he or she is waiting in line at a merchant, begin a transaction for purchasing goods or services on his or her mobile device. When the mobile device detects a network connection within a predetermined range, the mobile device may connect to the network (e.g., the network associated with the merchant). Once a connection is made, the transaction may be completed. For instance, when the user approaches the counter at the merchant, the user's mobile device may detect a network, connect to the network and complete the transaction the user began while waiting in line.

Figure 2:
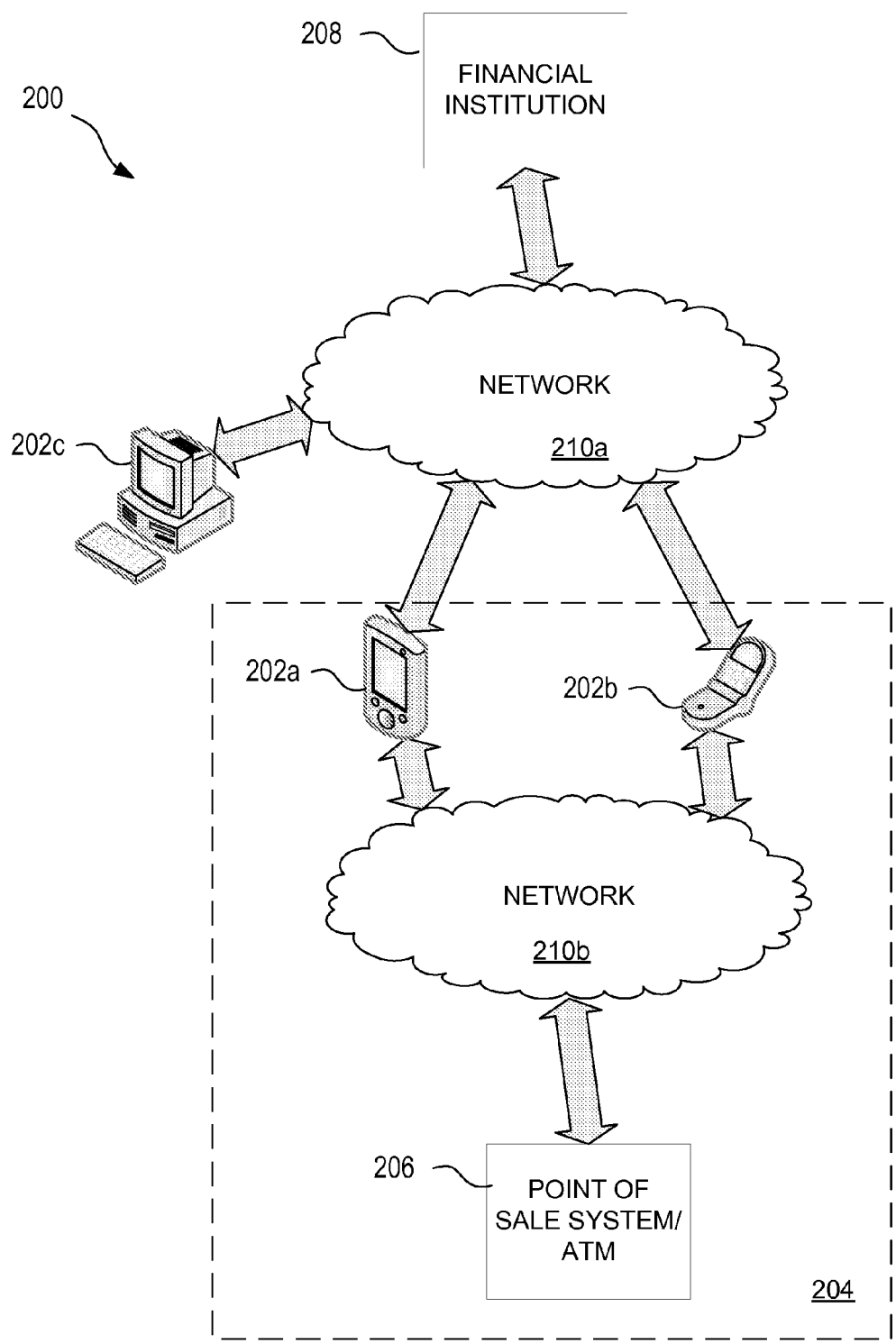
FIG. 2 illustrates an example computing environment for pre-processing transactions using a mobile device according to one or more aspects described herein.

FIG. 2 illustrates one example system for pre-processing transactions using a mobile device. In some examples, a user may begin a transaction at a mobile device, such as mobile devices 202a, 202b. The mobile device may include a cellular phone, personal digital assistant (PDA), smart phone, and the like. The user may begin the transaction by inputting transaction information including, for instance, an item identification (or, in some examples, scan a barcode), type of transaction, amount of transaction, method of payment, and the like. In some arrangements, the transaction information may be stored at mobile devices 202a and 202b.

The system 200 may also include one or more networks 210a and 210b. The network(s) 210a and 210b may comprise logically separate networks while using the same physical network channels. In one or more arrangements, network 210b may be a wireless local area network within a location 204 (such as a retail store) while network 210a may comprise a publicly accessible wide area network such as the Internet. Networks 210a and 210b may provide connectivity between devices 202a, 202b and 202c, point of sale system 206, such as at a merchant, an ATM, and the like and a financial institution 208. In some arrangements, the financial institution 208 may be located remotely from location 204. Connection between the mobile devices 202 and the point of sale system/ ATM 206, and the like may be wired or wireless. For example, networks 210a and 210b may comprise cellular links/connections, 802.11 connections, infrared links, optical communication links, satellite links and/or combinations thereof.

In some examples, devices 202a, 202b and 202c may be connected to one or more financial institutions such as financial institution 208 via network 210a. Communication between devices 202a, 202b and 202c and the financial institution 208 may permit use of various methods of payment for a transaction processed with devices 202a, 202b and 202c. For instance, if a user is purchasing an item and begins the transaction with mobile device 202a, the user may wish to pay for the purchase by debiting funds from one or more accounts held by financial institution 208. In particular, the user may direct the financial institution 208 to transfer funds from the user's account to an account of the retailer, merchant, service provider or the like. Additionally, communications between devices 202, financial institution 208 and point of sale system 206 may be encrypted or adhere to a security protocol to insure privacy.

In some examples, one or more personal computers 202c, stationary computer systems, work terminals, and the like may also be in communication with the financial institution 210 and/or the mobile devices 202a and 202b. For instance, a user may be connected to the financial institution 208 using his or her home computer 202c. In some examples, a user may begin a transaction at this home computer 202c and may store the transaction information for later use. The user may then later access the stored information via one of mobile devices 202a and 202b in order to complete the transaction, e.g., at point of sale 206.

Figure 3:
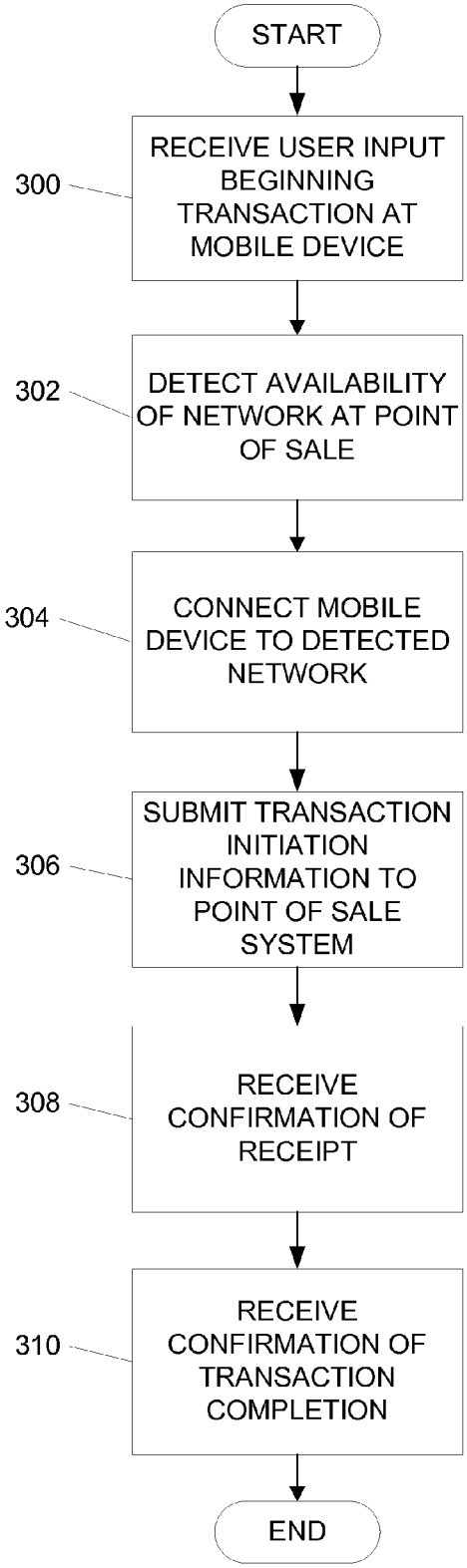
FIG. 3 illustrates one example method of pre-processing transactions using a mobile device according to one or more aspects described herein.

FIG. 3 illustrates one example method of pre-processing transactions using a mobile device. In step 300, input is received initiating a transaction at a mobile device. In some examples, the transaction may include a purchase of goods or services, a financial transaction such as an ATM withdrawal or deposit, and the like. In order to begin the transaction, transaction information, such as item being purchased (item identification number or bar code), price, type of transaction, method of payment, and the like, may be input into the mobile device. In some examples, a user may initiate the transaction when the mobile device is located remotely from the point of sale system, ATM, and the like at which the transaction will be completed. Item or service identification information may include a SKU #, model identifier, other product codes and/or a product or service name. Methods of payment may be pre-stored in the mobile device or may be entered on-the-fly (e.g., when initiating the transaction). Allowing a user to initiate the transaction prior to reaching the ATM or point of sale may provide for more efficient processing of transactions and may save time for the user and merchants. For example, a user may initiate an ATM withdrawal while still standing in line waiting for his or her turn at the ATM device.

In step 302 a network may be detected by the mobile device at the point of sale system, ATM, and the like. For example, the mobile device may detect that a network connection may be established with the point of sale system, ATM or the like once the mobile device has entered a communication range. In step 304, the mobile device may connect to the detected network. In some examples, the mobile device may automatically connect to a network detected within a predetermined range. Additionally or alternatively, detection of a network may prompt user input to connect to the detected network. This network connection may be a wireless or other connection associated with the merchant associated with the point of sale system, financial institution associated with the ATM, and the like. In some examples, the network detected may be within a predetermined range of the mobile device. For instance, the mobile device may detect the network once the device is within 3, 5 or 7 feet of the a point of sale system or ATM. This may aid in preventing connections to a network other than the desired network. Additionally or alternatively, a user may input one or more key words to aid in detecting the desired network. For instance, the user may input name of the merchant with which the transaction is being conducted. This name may be used as a keyword or search term to aid in identifying/detecting a network. In another example, the user may look for a network access point corresponding to the name of the service provider or merchant. In order to access the network, the user may be required to enter identifying information such as a bank card number and personal identification number (PIN). This prevents unauthorized or unknown users from generating excess traffic on the merchant or service provider's network and from illegally accessing confidential information.. Alternatively or additionally, the user device may be pre-registered with the merchant and given authorization to access the merchant or service provider network. For example, the user may register the device using a phone number, an electronic serial number (ESN) and/or the like.

According to one or more aspects, the user may access a public network such as the Internet using his or her device. The user may then access a merchant, retailer or service provider site (e.g., a website) from which the user may then initiate a transaction by identifying the ATM, store, register, checkout aisle and/or location corresponding to the user. The user may, in one or more arrangements, be required to login or provide identifying information.

Once the user's device has established a connection with the point of sale system and/or network associated therewith, service provider or other merchant, the user may submit transaction initiation information through the device in step 306. In step 308, the user may receive confirmation that the transaction information has been received by the service provider or merchant. The confirmation may further indicate that the point of sale system or ATM or other transaction processing device is prepared to complete the transaction. For example, the retailer may transmit the transaction information to the point of sale system and receive confirmation of receipt. The retailer may then provide this confirmation to the user at the user's device. In one or more arrangements, the retailer or other entity may provide an authorization code for retrieval of the initiated transaction upon the user reaching the ATM or point of sale device. Optionally, the user's device may be notified upon completion of the transaction in step 310 (e.g., once the user has reached the point of sale or ATM and completed all transaction activities such as retrieval of funds, payment and the like). In some examples, completion of the transaction may occur when the mobile device reaches the point of sale system, for instance, after beginning the transaction while waiting in line to purchase one or more products. In some examples, an ATM transaction, such as a deposit or withdrawal, may be started at the mobile device while waiting in line for the ATM. Completion of the transaction may then occur upon reaching the ATM.

Figure 4:
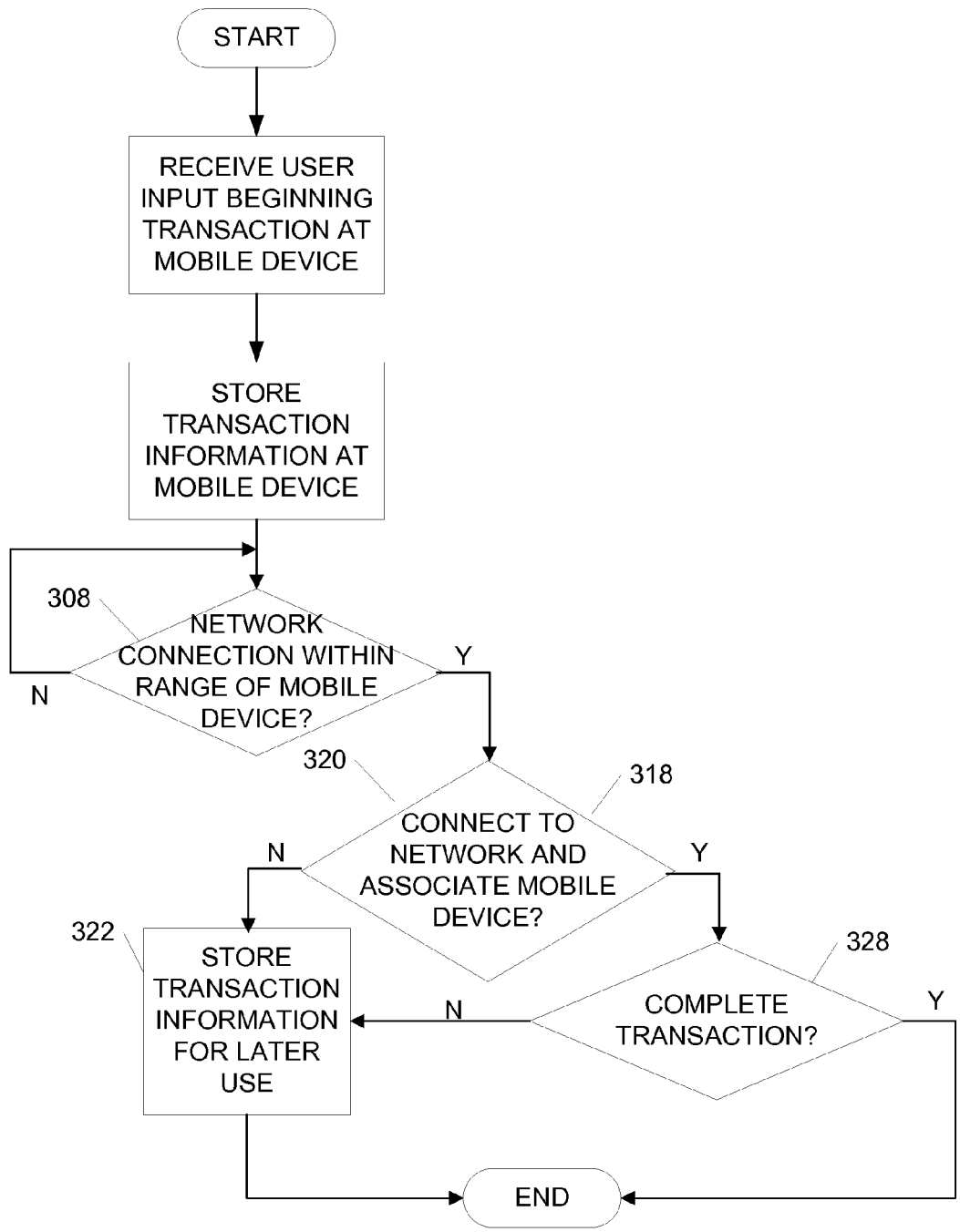
FIG. 4 illustrates another example method of pre-processing transactions using a mobile device according to one or more aspects described herein.

FIG. 4 illustrates another example method of pre-processing transactions using a mobile device. In step 400, a transaction is started at a mobile device. In some examples, beginning a transaction may include receiving user input of transaction information. In step 402, the transaction information associated with the start of the transaction is stored at the mobile device. In step 404, a determination is made as to whether a network connection is within range of the mobile device. If no network is within range, the mobile device will continue to search for a network within range. If a network is detected in step 404, a determination is made to connect to the detected network and associate the mobile device with the network in step 406. If no connection is made between the network and the mobile device, the transaction information may be stored for later use in step 408. If a connection is made in step 406, the transaction may be completed in step 410. In some examples, a user may be prompted to confirm completion of the transaction in step 410. If the transaction is completed, the method ends. If the transaction is not completed in step 410, the transaction information may be stored for later use in step 408.

Figure 5:
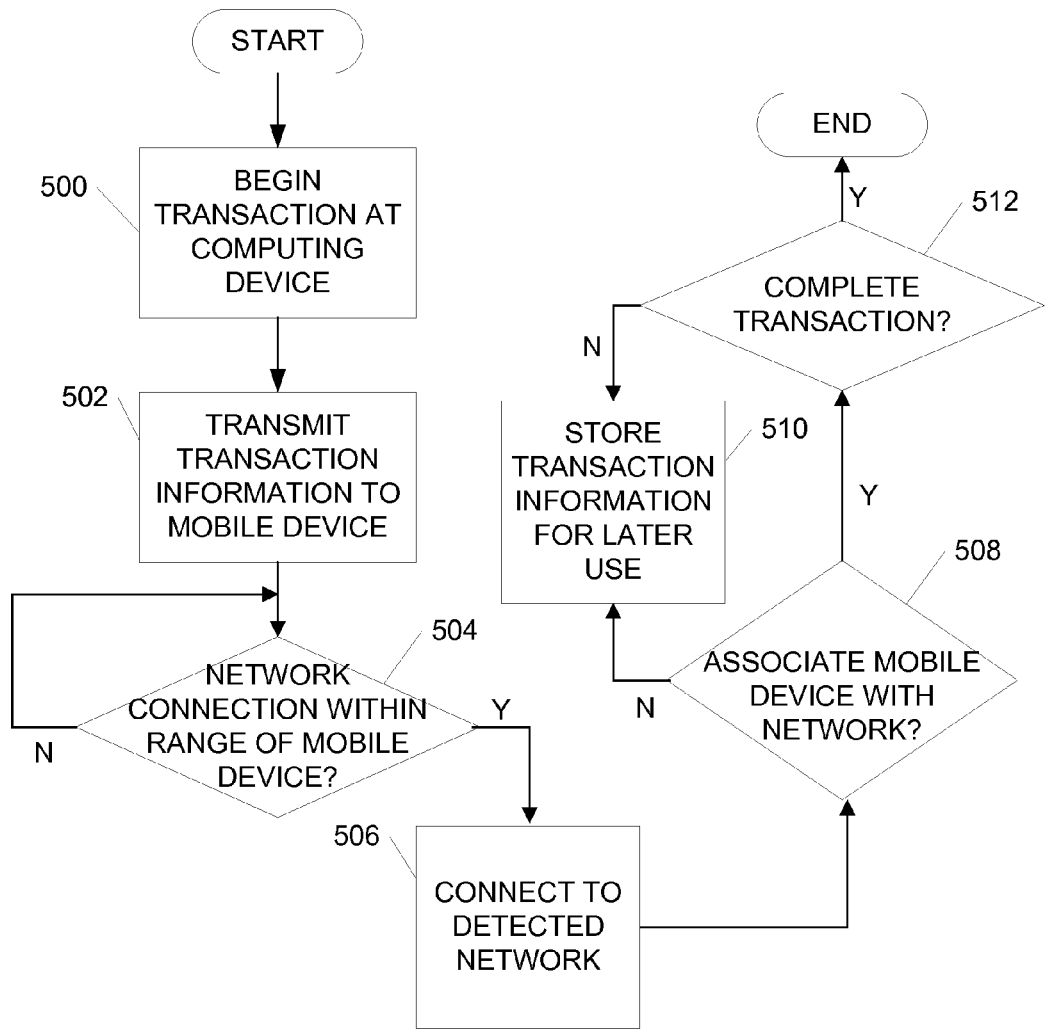
FIG. 5 illustrates yet another example method of pre-processing transactions according to one or more aspects described herein.

FIG. 5 illustrates yet another example of pre-processing transactions. In step 500, a transaction is begun at a computing device. In some examples, the computing device may be a home computer, computer terminal, and the like. In some examples, the computing device may be a stationary computing device such as a desktop personal computer. Beginning the transaction may include inputting transaction information similar to the arrangements discussed above. In step 502, the transaction information may be transmitted from the computing device to a mobile device. The mobile device may be a cellular telephone, smart phone, PDA, and the like.

In step 504 a determination may be made as to whether there is a network connection within a predetermined range of the mobile device. If no network is detected, the mobile device may continue to search for a connection. If a network is detected, the mobile device may automatically connect to the detected network in step 506. Alternatively, the mobile device may prompt a user to connect to the detected network. In step 508 a determination is made to connect the mobile device to the detected network. If no association is made, the transaction information may be stored for later use in step 510. If the mobile device is associated with the network in step 508, the transaction may be completed in step 512. Alternatively, the transaction may not be completed in step 512 and the transaction information may be stored for later use in step 510.

FIG. 6 illustrates one example user interface for inputting transaction information. The user interface 600 may include a transaction identification field 602. This field may allow a user to input a name or other identifier to assign to the transaction. In some examples, the transaction identifier may be a simple word or phrase to remind the user of the purpose of the transaction, such as lunch, coffee, handbag, and the like. In other examples, the transaction identifier may be automatically generated upon beginning the transaction and may be unique to the transaction. In field 604 a type of transaction may be input. Types of transactions may include the purchase of goods or services, financial transactions such as an ATM withdrawal of deposit, and the like. In field 606 an amount of the transaction may be indicated. The amount may be a cost of the purchase, amount of withdrawal or deposit, and the like. In some examples, the amount indicated may be adjusted for sales tax, discounts that may be available upon completion of the transaction, and the like.

The user interface 600 may further include a method of payment field 608. The method of payment may include credit card, debit card, electronic funds transfer (EFT), cash upon completion of the transaction, and the like. In some examples, the method of payment may be selected from a drop down menu of options. Fields 610 and 612 provide input regions for a financial institution routing number and account number, respectively. These fields may be used with EFT is the method of payment or may be used when the transaction is an ATM withdrawal or deposit. Additional transaction information may be provided as desired and nothing in this figure or associated description should be viewed as limiting the transaction information to only those items discussed.

Figure 7:
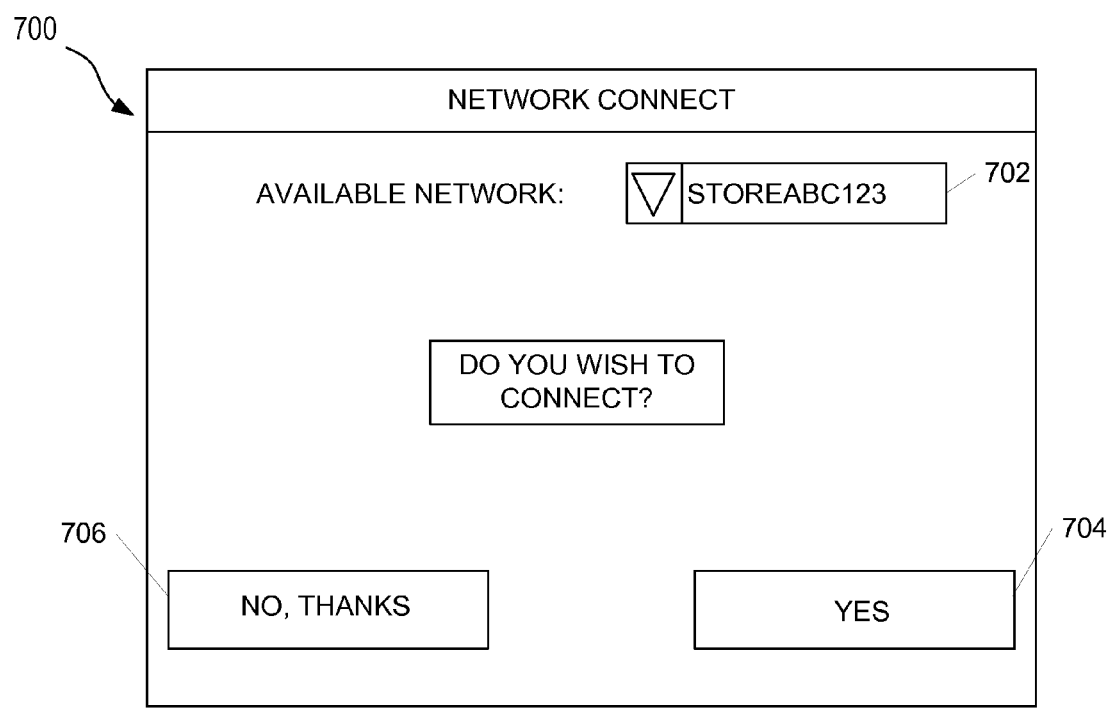
FIG. 7 illustrates one example user interface illustrating options for connecting a mobile device to a network according to one or more aspects described herein.

FIG. 7 illustrates one example user interface 700 for connecting the mobile device to a detected network. The interface 700 may include a detected network available for connection in field 702. In some examples, multiple networks may be detected and/or available and the desired network may be selected from a drop down menu of options. To connect to the desired/selected network, the user may select yes option 704. Alternatively, if the user does not with to connect to the detected/selected network, no option 706 may be selected.

Figure 8:
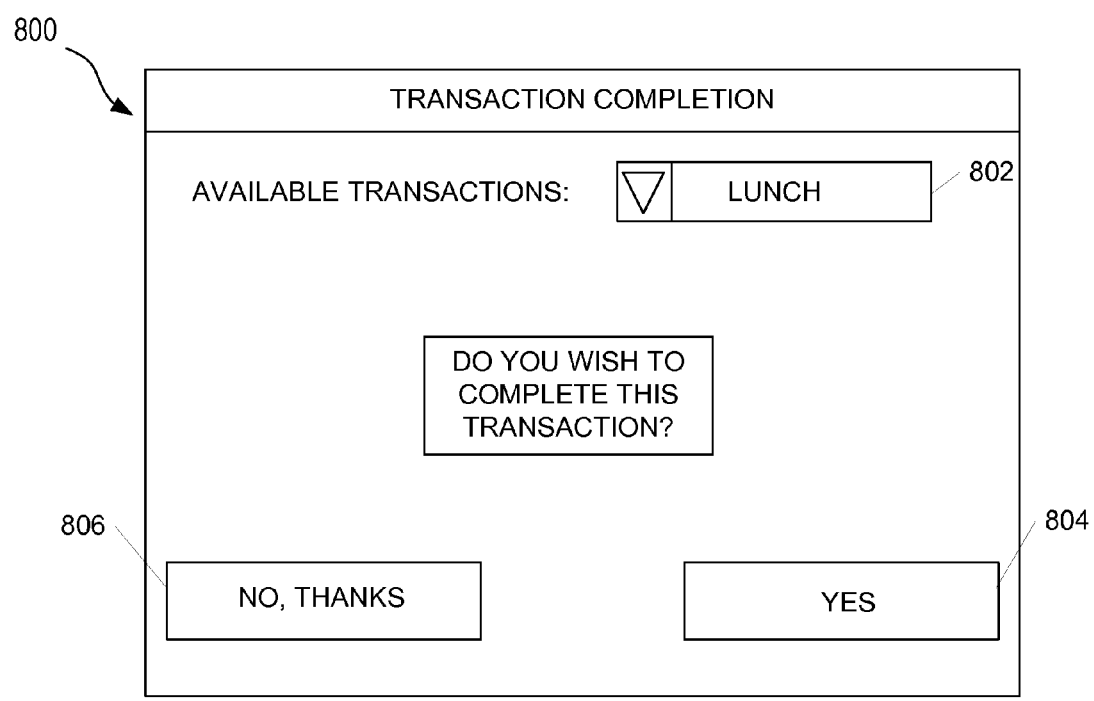
FIG. 8 illustrates one example user interface illustrating options for completing a transaction begun at a mobile device according to one or more aspects described herein.

FIG. 8 illustrates one example user interface 800 for completing a transaction. In field 802 the transaction to be completed may be selected. In some examples, the transaction identifier may appear in field 802. In some arrangements, the desired transaction may be selected from a drop down menu of options. To complete the desired/selected transaction, yes option 804 may be selected. Alternatively, if a user does not wish to complete the transaction, no option 806 may be selected. In some examples, selection of no option 806 may include storage of the transaction information for later use.

FIG. 9 illustrates an example method by which a financial institution system may pre-process ATM transactions. In step 900, the financial institution system may receive a request to initiate an ATM transaction. The request may include a variety of information including user identification, user authentication information, transaction type (e.g., deposit, withdrawal, check cashing, and the like), transaction amount and the like. In step 905, the financial institution system may determine a location or ATM associated with the request. In one example, the location or ATM may be identified based on a GPS location of the device from which the request was received or based on a manual user selection of the location or ATM. In step 910, the financial institution system may determine whether the requested transaction type is available at the determined location or ATM. If the requested type if not available at the specified location, the system may return an error message to the user device in step 930 indicating that the transaction cannot be completed at the specified ATM location. This may save the user time and help the user avoid the frustration of reaching the ATM after waiting in line, only to realize that the ATM does not accept checks or other transaction types.

If, on the other hand, the transaction type is serviceable at the determined ATM location, the financial institution system may pre-authorize and pre-process the transaction in step 915. Pre-authorization of the transaction may include determining that a sufficient amount of funds exist in the user's bank account, whether the amount of funds exceeds a predefined daily withdrawal limit and the like. In one or more arrangements, pre-authorization of the transaction may include transmitting the transaction information to a local system at the ATM location for pre-processing. The financial institution system may thus receive confirmation or rejection of the pre-processing request. In other arrangements, the financial institution system may correspond to the local system at the ATM location. If the transaction has been pre-processed and pre-authorized as determined in step 920, the financial institution system may provide confirmation to the user's device in step 925. The confirmation may include a transaction identifier or other transaction code for identification of the pre-authorized transaction. The transaction code or identifier may be required for completion of the transaction (e.g., completing a purchase, receiving withdrawn funds). Otherwise, the user may be required to begin a new transaction upon reaching the ATM device. In one or more arrangements, the financial institution system may further institute a time limit within which the transaction must be completed (e.g., 10 minutes, 30 minutes, 1 hour, 12 hours, a day, and the like). Time limits may be enforced to insure that transaction codes are not lost and misused or otherwise compromised.

Upon reaching an ATM device, a user may enter user identification information (e.g., a bank card and a PIN). The ATM device may then immediately dispense the requested amount of funds (for a withdrawal), activate a check or currency receiving device (for deposits), dispense a requested number of stamps (for ATMs with stamp purchasing capabilities) and the like. Accordingly, with pre-processing of a transaction, the user might not have to engage in selecting the type of transaction, selecting an account from which to withdraw or to which to deposit, entering an amount of withdrawal or deposit and the like. Receipts might also be provided electronically to the user device rather than having the user wait for the receipt to print out at the ATM.

While the above example process relates to ATMs and processing of ATM transactions, other type of transactions such as product purchases and service requests may be pre-processed in similar fashion. For example, a user may identify all products he or she wishes to purchase, method of payment and amount of payment while still in a checkout line prior to reaching a cashier. Once the user reaches the cashier or checkout device (e.g., point of sale), the user submit payment, receive any change and complete the purchase. In one or more arrangements, a store employee may be required to submit confirmation that the list of products identified by the user in the transaction pre-processing information is accurate. However, the point of sale system or employee might not need to scan each item, advise the user of the total or swipe/process a credit card.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
   prior to a user of a mobile device physically interacting with a currency dispensing device:
   initiating a transaction by the mobile device, wherein the transaction involves use of the currency dispensing device;
   receiving and storing information associated with the transaction by the mobile device;
   communicating, by the mobile device and to a financial institution associated with the currency dispensing device, information identifying a geographic location of the mobile device;
   receiving, by the mobile device and from the financial institution associated with the currency dispensing device, confirmation that the currency dispensing device is available for performing the transaction, wherein the confirmation that the currency dispensing device is available for performing the transaction is based at least in part on the information identifying the geographic location of the mobile device;
   detecting, by the mobile device, a network within a predetermined range of the mobile device, the network being associated with the currency dispensing device;
   connecting, by the mobile device, to the detected network;
   transmitting the transaction information to the currency dispensing device prior to the user of the mobile device physically interacting with the currency dispensing device; and
   receiving a confirmation of receipt of the transaction information from the currency dispensing device, the confirmation including an authorization code configured for at least one of: retrieving the transaction at the currency dispensing device and confirming completion of the transaction.

2. The method of claim 1, wherein the predetermined range is less than seven feet.

3. The method of claim 1, wherein the transaction is at least one of a withdrawal or a deposit.

4. The method of claim 1, further comprising completing the transaction including receiving a receipt from the currency dispensing device, wherein the receipt provides a record of the transaction.

5. The method of claim 1, further comprising transmitting a message from the mobile device to the currency handling device, the message comprising confirmation of receipt of a withdrawn amount of funds.

6. The method of claim 1, wherein the confirmation of receipt is associated with a specified time limit within which the transaction must be completed.

7. The method of claim 1, wherein connecting to the network includes:
   receiving user entry of a financial account security code of the user;
   verifying the financial account security code of the user; and
   allowing access to the network upon verifying the financial account security code of the user.

8. A non-transitory computer readable medium storing computer readable instructions that, when executed, cause a mobile device to:
   prior to a user of the mobile device physically interacting with a currency dispensing device:
   initiate a transaction by the mobile device, wherein the transaction involves use of the currency dispensing device;
   receive and store information associated with the transaction by the mobile device;
   communicate, by the mobile device and to a financial institution associated with the currency dispensing device, information identifying a geographic location of the mobile device;
   receive, by the mobile device and from the financial institution associated with the currency dispensing device, confirmation that the currency dispensing device is available for performing the transaction, wherein the confirmation that the currency dispensing device is available for performing the transaction is based at least in part on the information identifying the geographic location of the mobile device;
   detect a network within a predetermined range of the mobile device, the network being associated with the currency dispensing device;
   connect to the detected network;
   transmit the transaction information to the currency dispensing device prior to the user of the mobile device physically interacting with the currency dispensing device; and
   receive a confirmation of receipt of the transaction information from the currency dispensing device, the confirmation including an authorization code configured for at least one of: retrieving the transaction at the currency dispensing device and confirming completion of the transaction.

9. The computer readable medium of claim 8, further comprising instructions for completing the transaction including receiving a receipt from the currency dispensing device, wherein the receipt provides a record of the transaction.

10. The computer readable medium of claim 8, further comprising instructions for transmitting a message from the mobile device, the message comprising confirmation of receipt of a withdrawn amount of funds.

11. The computer readable medium of claim 8, wherein the confirmation of receipt is associated with a time limit within which the transaction must be completed.

12. The computer readable medium of claim 8, wherein connecting to the network includes:
   receiving user entry of a financial account security code of the user;
   verifying the financial account security code of the user; and
   allowing access to the network upon verifying the financial account security code of the user.

\* \* \* \* \*